A. F. SCHNEIDER.
MILK PAIL AND COVER.
APPLICATION FILED FEB. 26, 1912.
1,047,574.
Patented Dec. 17, 1912.
2 SHEETS—SHEET 1.
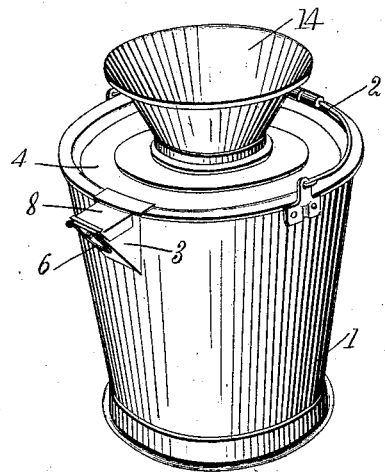
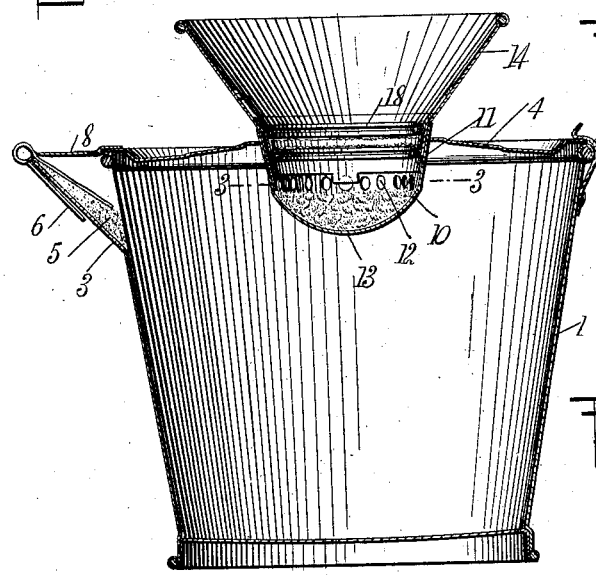
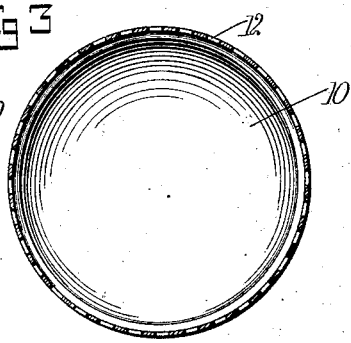
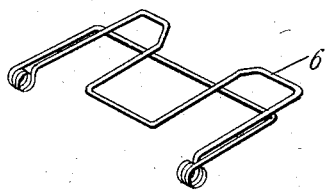
WITNESSES
C. J. Hachenberg
A. L. Kitchin
INVENTOR
Adolph F. Schneider
BY Munn & Co
ATTORNEYS

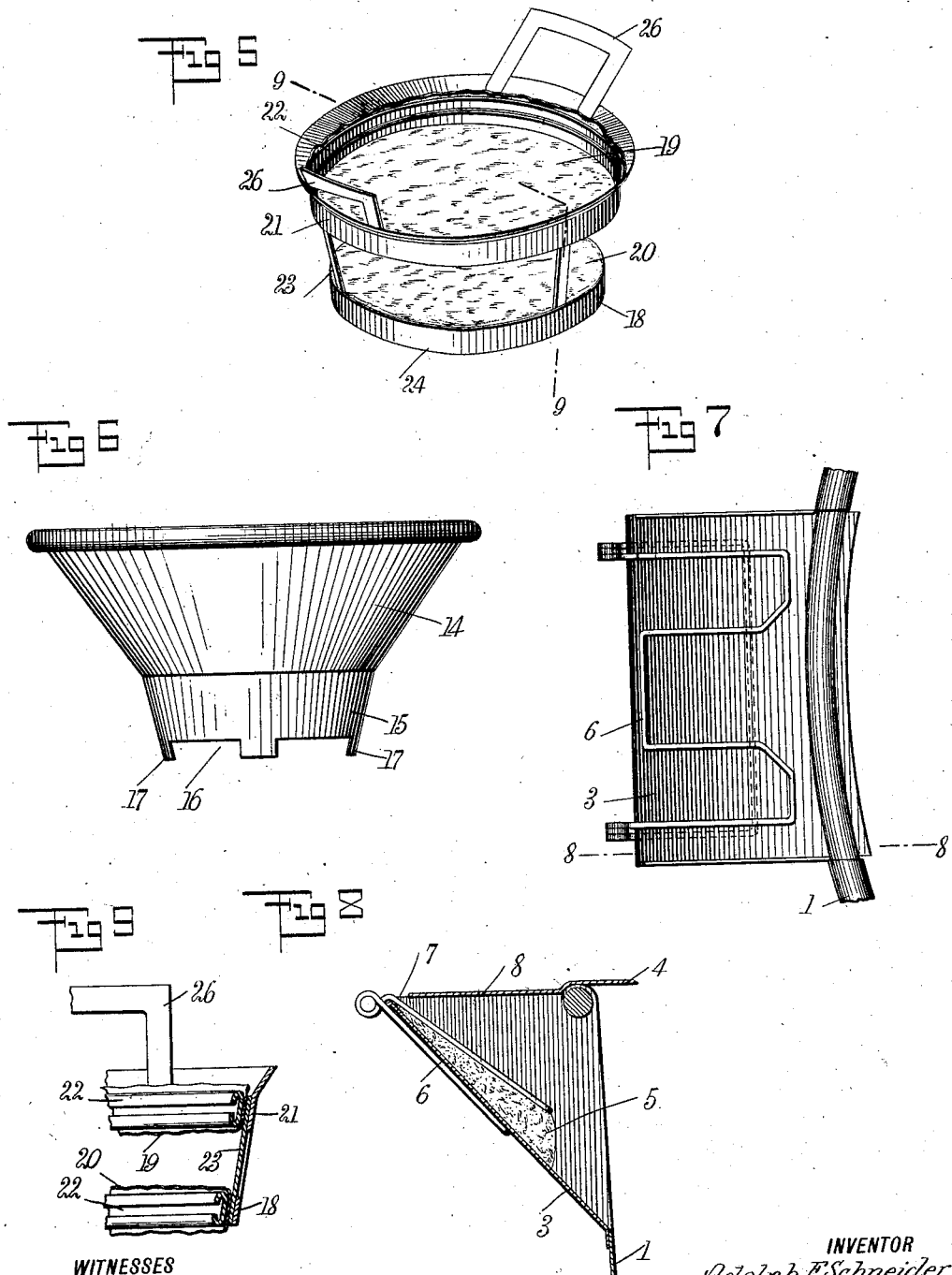

UNITED STATES PATENT OFFICE.

ADOLPH F. SCHNEIDER, OF ELIZABETH, NEW JERSEY.

MILK-PAIL AND COVER.

1,047,574.  Specification of Letters Patent.  Patented Dec. 17, 1912.

Application filed February 26, 1912. Serial No. 679,826.

*To all whom it may concern:*

Be it known that I, ADOLPH F. SCHNEIDER, a citizen of the United States, and a resident of Elizabeth, in the county of Union and State of New Jersey, have invented a new and Improved Milk-Pail and Cover, of which the following is a full, clear, and exact description.

This invention relates to improvements in milk pails and covers, and has for an object to provide an improved structure adapted to substantially prevent the ordinary mixing of dirt and foreign matter with the milk.

Another object of the invention is the provision of improved means for automatically straining the milk at the time of milking, before the milk reaches the receptacle into which it is being milked.

A still further object of the invention is to provide a pail or bucket formed with a removable lid, the bucket being formed with a straining spout for straining to a certain extent milk poured from the bucket, the lid being formed with straining members for straining the milk as the same enters the bucket.

A still further object of the invention is to provide a combined guiding and straining device in connection with a milk pail which will normally seal the pail but which will permit the milk to pass into the pail through straining mediums and through tortuous passageways.

In carrying out the objects of the invention, a pail of any desired kind and size is used, formed with a spout covered with a comparatively small mouth and accommodating a piece of cotton or other straining medium, which substantially fills the mouth so that liquid being poured from the bucket will be strained during the discharge. Connected with the cover is a removable funnel designed to guide the milk to a settling cup formed with a plurality of apertures spaced above the bottom. Arranged in the bottom of the settling cup is a bunch of raw cotton or other filtering medium, which is designed to receive the impurities of the milk, but which permits the milk to pass out radially positioned apertures and be discharged into the bucket or pail. Arranged above the apertures is a removable double straining device formed with spaced straining cloths through which the milk must pass before the same reaches the settling cup so that all of the larger impurities are held against entrance before the same have a chance to pass into the settling cup.

A practical embodiment of the invention is represented in the accompanying drawings forming a part of this specification, in which similar characters of reference indicate corresponding parts in all the views.

Figure 1 is a perspective view of an embodiment of the invention ready for use; Fig. 2 is a longitudinal vertical section through an embodiment of the invention; Fig. 3 is a section through Fig. 2 on the line 3—3, the same being shown on an enlarged scale; Fig. 4 is a detail perspective view of a clamping spring embodying certain features of the invention; Fig. 5 is an enlarged detail perspective view of a removable strainer; Fig. 6 is an enlarged side view of the guiding funnel; Fig. 7 is a top plan view of the discharge spout, part of the bucket being shown in connection therewith; Fig. 8 is a section through Fig. 7 on the line 8—8, the cover being shown applied; and Fig. 9 is a section through Fig. 5 on the line 9—9.

Referring to the accompanying drawings by numerals, 1 indicates a bucket or pail of any desired kind, having, if desired, a handle 2. The pail or bucket 1 is provided with a spout 3 and a removable cover 4 designed to normally maintain the bucket 1 closed. The spout 3 is made of any desired size and shape, and is adapted to be provided with a piece of raw cotton 5, held in place by a spring 6. The cotton 5 partially closes the opening 7 and provides a settling and straining medium for the milk or other contents of the bucket as the same passes out the spout 3. A cover 8, preferably rigidly connected with the cover 4, is provided so as to limit the flow and spread the milk or other contents in a thin sheet, the spout 3 being made preferably comparatively wide, as shown in Fig. 7, for this purpose.

The cover 4 is held in place by any desired number of clips 9, which will permit the cover to be readily applied and removed, but which will normally hold the cover firmly in place. Rigidly secured, preferably centrally of the cover 4, is a settling cup 10 having a slightly beveled wall 11 and a plurality of apertures 12. The apertures 12 are arranged above the bottom of the cup so that milk or other fluid passing into the cup will have a chance to settle before passing out of the cup into the bucket 1. In order to assist in holding the impurities, raw cotton 13 is placed in the bottom of the cup 10, which thereby acts in a certain sense as a filtering medium. Fitting into the cup 10 is a receiving funnel 14 having a beveled lower portion 15 designed to fit tightly against the beveled portion 11 of the cup 10 when the funnel is in position. In order to positively prevent the funnel 14 from closing the apertures 12, the funnel is cut away at 16 thereby defining legs 17.

Arranged to fit the beveled portion 15 of the funnel 14, is a strainer 18. The strainer 18 is provided with upper and lower straining cloths 19 and 20. The straining cloth 20 is held in place by an outer ring 21 and an inner ring 22. These rings are slightly conical in shape so as to bind tightly the filtering cloth. The cloth 20 is held in place in the same manner and is held spaced a predetermined distance from the cloth 19 by the spokes 23 which are rigidly secured to the ring 21 and ring 24. Suitable handles 26 are provided for inserting and removing the strainer.

In operation, after milking one cow the strainer 18 is removed and rinsed until clean and again inserted. This requires only a moment and provides a clean strainer for each cow so that the foreign matter in the milk will not be forced through the filter by successive milkings. Also by the use of the strainer 18 the bucket 1 is positively sealed or closed against the entrance of dust or dirt. It will also be evident that the funnel 14, the cotton 13, cotton 5, and strainer 6, may be quickly removed and sterilized whenever desired, or replenished.

Having thus described my invention I claim as new and desire to secure by Letters Patent:

1. In a device of the character described, a receptacle, a removable cover therefor formed with an aperture therein, a settling cup arranged in said aperture and filling said aperture, said settling cup being formed with apertures in the side walls thereof, fibrous material arranged in the bottom of said settling cup, a strainer arranged at the top of said settling cup, a discharge spout connected with the receptacle, and a fibrous material substantially filling said spout.

2. In a device of the character described, a receptacle, a cover therefor formed with an aperture therein, a settling cup formed with discharge apertures, said settling cup filling the aperture in said cover, a guiding funnel fitting into said settling cup, and a strainer fitting into the bottom of said funnel, said strainer comprising a pair of spaced rings, a sheet of straining material occupying the space in said rings, and a binding ring for each of said first mentioned rings for binding said straining material in place.

3. In a device of the character described, a receptacle, a cover therefor formed with an aperture therein and a strainer fitting into said aperture, said strainer comprising a pair of spaced rings, a sheet of straining material occupying the space in said rings, and a binding ring for each of said first mentioned rings for binding said straining material in place.

4. In a device of the character described, a receptacle, a cover therefor formed with an aperture therein, straining means including a fibrous material arranged in said apertures, a spout for said receptacle, and a straining fibrous material arranged in said spout whereby fluid entering the receptacle will be strained on entering, and on passing out.

5. In a device of the character described, a receptacle, a cover therefor formed with an aperture therein, a settling cup rigidly connected with said cover arranged in said aperture, said settling cup having inclined or conical-shaped walls, said settling cup being also formed with a plurality of apertures spaced from the bottom thereof, a guiding funnel formed with a flaring mouth and a conical-shaped tubular portion for fitting into said inclined conical shaped walls of the settling cup, said guiding funnel having a plurality of legs extending therefrom for spacing the lower edge of the funnel from the bottom of the settling cup whereby said apertures in the settling cup are continually exposed, and a strainer arranged in said funnel.

In testimony whereof I have signed my name to this specification in the presence of two subscribing witnesses.

ADOLPH F. SCHNEIDER.

Witnesses:
WM. T. LEAREY,
JOSEPH A. LEACH.

---

Copies of this patent may be obtained for five cents each, by addressing the "Commissioner of Patents, Washington, D. C."